United States Patent
Bender et al.

(10) Patent No.: US 8,581,858 B2
(45) Date of Patent: Nov. 12, 2013

(54) TOUCH PAD ARRANGEMENT

(75) Inventors: Klaus-Werner Bender, Muenzenberg (DE); Dieter Nau, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 976 days.

(21) Appl. No.: 12/599,796

(22) PCT Filed: Apr. 16, 2008

(86) PCT No.: PCT/EP2008/054579
§ 371 (c)(1),
(2), (4) Date: Jan. 12, 2010

(87) PCT Pub. No.: WO2008/138700
PCT Pub. Date: Nov. 20, 2008

(65) Prior Publication Data
US 2010/0300770 A1    Dec. 2, 2010

(30) Foreign Application Priority Data
May 11, 2007   (DE) .......................... 10 2007 022 085

(51) Int. Cl.
G06F 3/041     (2006.01)
G06K 11/06     (2006.01)
G08C 21/00     (2006.01)

(52) U.S. Cl.
USPC ........................................ 345/173; 178/18.03

(58) Field of Classification Search
None
See application file for complete search history.

(56) References Cited

U.S. PATENT DOCUMENTS

| 2004/0075676 | A1 | 4/2004 | Rosenberg et al. |
| 2005/0052425 | A1 | 3/2005 | Zadesky et al. |
| 2005/0264537 | A1* | 12/2005 | Yang ............................ 345/173 |
| 2007/0052691 | A1 | 3/2007 | Zadesky et al. |
| 2007/0146348 | A1 | 6/2007 | Villain |

FOREIGN PATENT DOCUMENTS

| EP | 419145 A1 * | 3/1991 |
| JP | 2000200141 | 7/2000 |
| WO | WO 02073587 | 9/2002 |
| WO | WO 2005019987 | 3/2005 |
| WO | WO 2006029974 | 3/2006 |

* cited by examiner

Primary Examiner — Nicholas Lee
(74) Attorney, Agent, or Firm — Cozen O'Connor

(57) ABSTRACT

A touch pad arrangement having a touch pad which has a sensitive operating surface and which can be moved in a direction of movement by a guide mechanism in a guided manner without tipping between a raised resting position and a lowered position. A lever mechanism is arranged on at least two side areas of the touch pad lying opposite each other. The lever mechanism includes two levers which extend approximately toward each other along their own axes, and which are pivotably mounted in the center of their length about a fixed joint with an axis which extends transversally to the direction of movement of the touch pad. The levers can be acted upon in the direction of movement of the touch pad on the lever ends facing away from each other, by the touch pad or a touch pad support supporting the touch pad, and are connected to each other on their facing ends via a flexible connection.

23 Claims, 4 Drawing Sheets

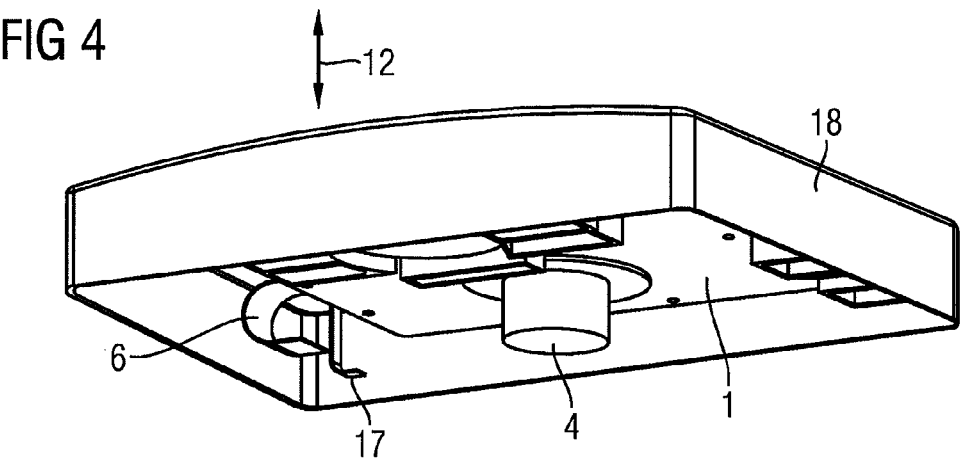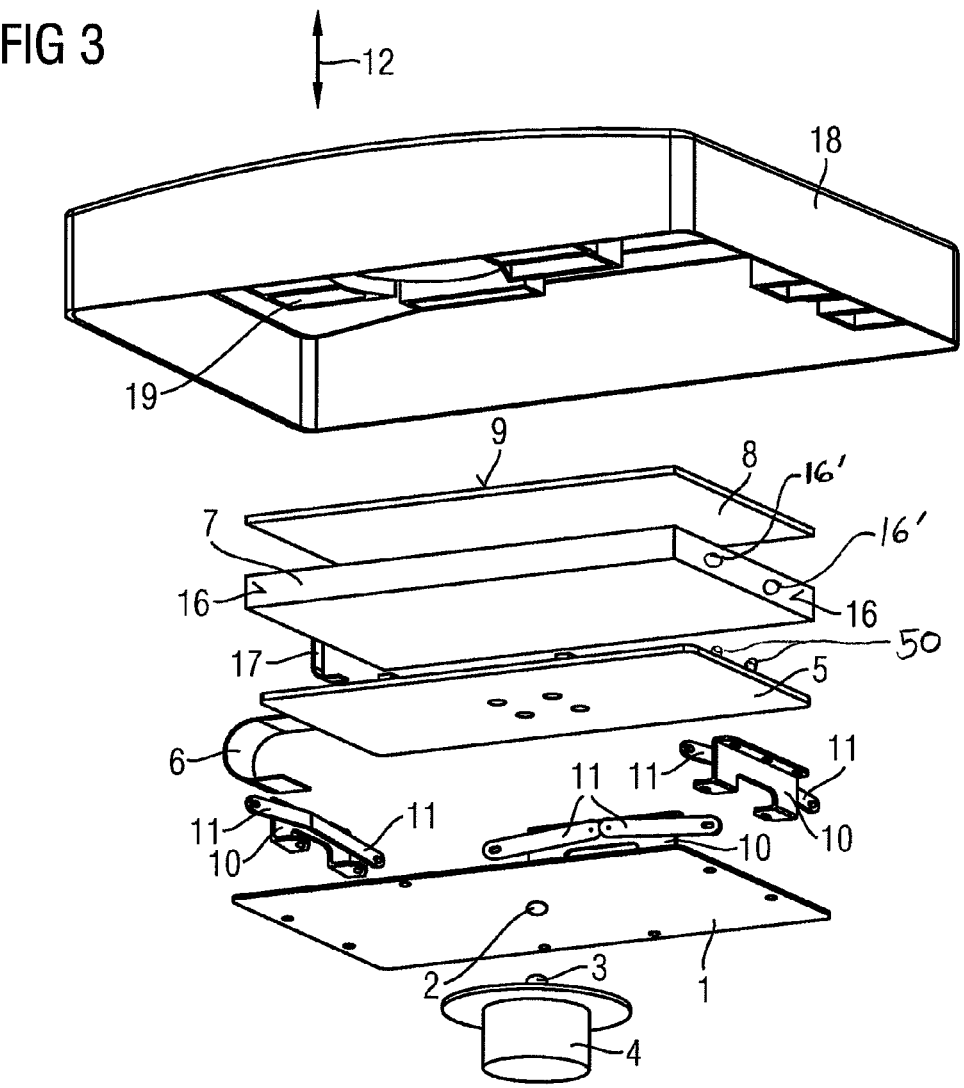

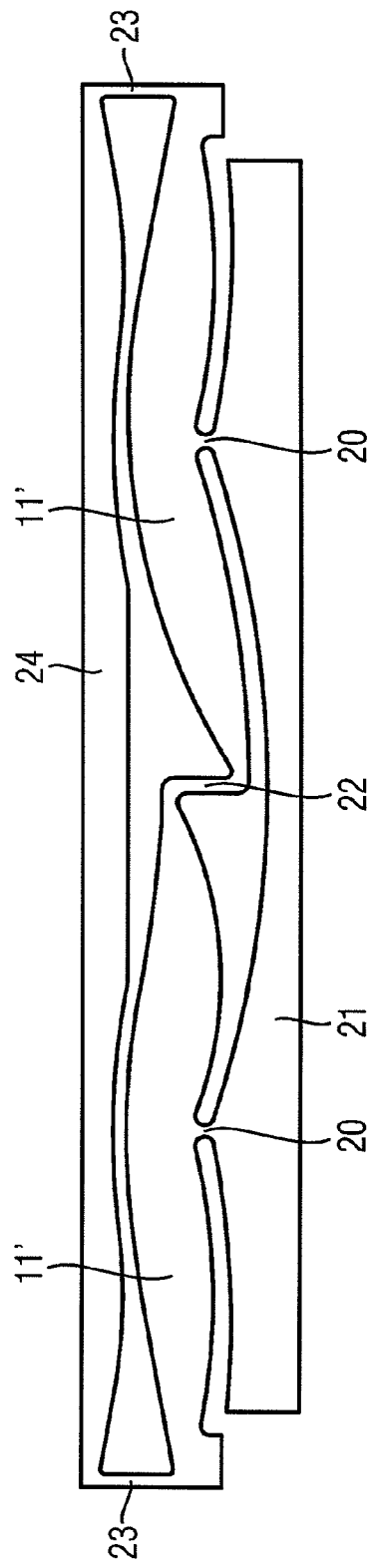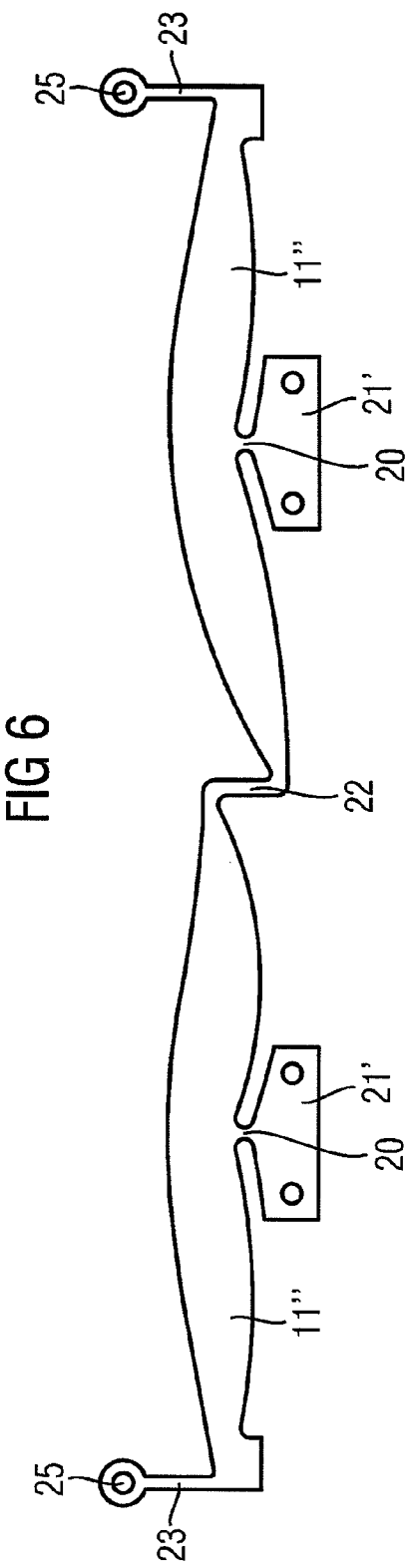

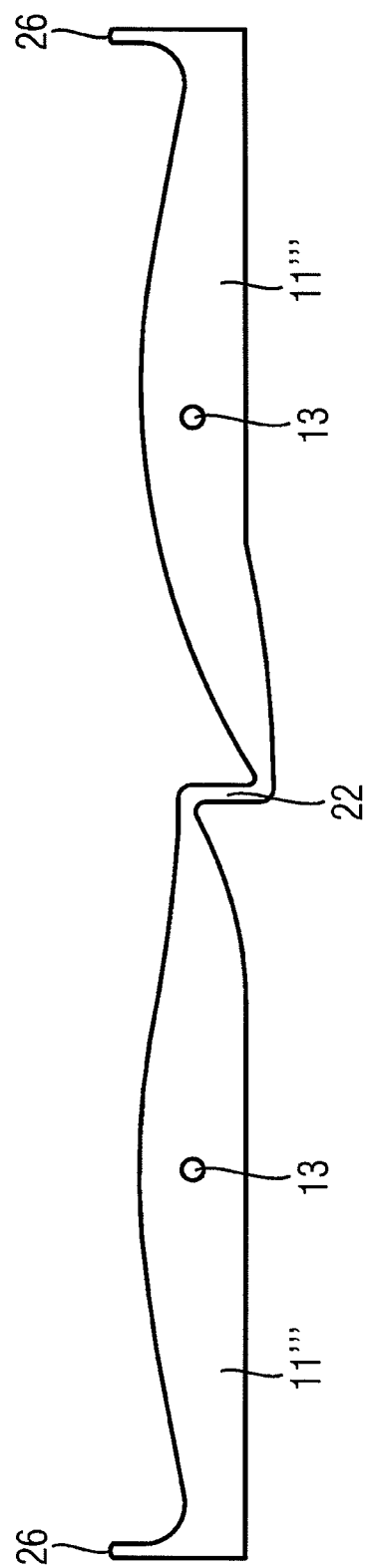

TOUCH PAD ARRANGEMENT

PRIORITY CLAIM

This is a U.S. national stage of application No. PCT/EP2008/054579, filed on Apr. 16, 2008, which claims Priority to the German Application No. 10 2007 022 085.79, filed: May 11, 2007, the contents of both being incorporated herein by reference.

BACKGROUND OF THE INVENTION

1. Field of the Invention

The invention relates to a touch pad arrangement having a touch pad with a sensitive operating surface that can be moved in a direction of movement between a raised rest position and a lowered position while being guided without tipping by a guide mechanism.

2. Prior Art

In a touch pad arrangement of this kind, the intention is that the sensitive operating surface should be lowered by about 0.5 to 1 mm during actuation by the user, and the operating surface should remain substantially perpendicular to the direction of actuation during this process. In the case of large-area touch pads, however, a large tilting moment arises in the event of actuation in an edge region of the touch pad, which leads to tilting of the touch pad.

A known method of avoiding tilting is to place the touch pad on a scissor mechanism. When the touch pad is actuated in an edge region, the scissor mechanism ensures that the opposite edge region is moved in the direction of movement at the same time. Here, force transmission takes place by links of the scissor mechanism, the force being transmitted in one direction by bending stress and, in the direction perpendicular thereto, by torsional stress.

If the scissor mechanism is not arranged underneath the touch pad, the dimensions of the scissor mechanism must be matched to the dimensions and size of the touch pad.

SUMMARY OF THE INVENTION

It is therefore an object of the invention to provide a touch pad arrangement that can be used for touch pads of different sizes and is of simple construction.

According to one embodiment of the invention, this object is achieved by virtue of the fact that a lever mechanism is arranged on at least two mutually opposite side areas of the touch pad, the lever mechanism consisting of two levers which extend approximately longitudinally relative to one another and, in the center of their length, are each mounted in such a way that they can pivot about a fixed joint with a pivot which extends transverse to the direction of movement of the touch pad, the levers being capable of being acted upon in the direction of movement of the touch pad at the mutually remote lever ends by the touch pad or by a touch pad support supporting the touch pad. The levers are connected to each other at their mutually adjacent ends by a flexible connection.

The lever mechanisms, which, in one embodiment, are separate, are of simple construction and can be arranged in a space-saving manner, it being possible to use the same lever mechanisms for touch pads of different sizes.

Since the levers are stressed during bending, a deliberately high stiffness can be achieved if they are designed as sheet-metal components.

A simple design of the fixed joint comprises the fixed joint having a pivot pin arranged in a fixed location, on which the lever is pivotably mounted.

The lever preferably has a pivot hole by which it is pivotably mounted on the pivot pin.

A design of the fixed joint with a particularly small number of components comprises the fixed joint being an elastic connecting web, one end of the elastic connecting web being arranged in a fixed location and the other end of the elastic connecting web being connected to the lever.

The ends of the elastic connecting webs of two flexibly interconnected levers which are arranged in a fixed location can be connected to a common base element arranged in a fixed manner. This arrangement makes it possible to secure the two levers by means of a single component.

A design with a small number of components is likewise obtained if the flexible connection at the mutually adjacent ends of the levers is a second elastic connecting web, the mutually adjacent ends of the levers preferably being arranged offset relative to one another in the direction of movement, and the elastic connecting web being designed to extend approximately in the direction of movement.

Another design of the flexible connection of the mutually adjacent ends of the levers consists in the flexible connection between the mutually adjacent ends of the levers being formed by gear segments which extend on the ends of the levers in a plane corresponding to the direction of movement and the teeth of which engage in one another.

If, at their mutually remote ends, the levers are hinged on the touch pad or on the touch pad support supporting the touch pad such that they can be pivoted about pivot axes extending transversely to the direction of movement of the touch pad, the touch pad acts on the levers via this hinge.

A design for achieving this includes the mutually remote ends of the levers having elongate holes that extend in the direction of longitudinal extension and into which pivot pins of the touch pad or of the touch pad support which extend transversely to the direction of movement project, the elongate holes allowing the required relative motion between the pivot pins and the ends of the levers.

Another design with a small number of components includes the mutually remote ends of the levers being connected to the touch pad or to the touch pad support by means of a third elastic connecting web.

The ends of the third elastic connecting webs, which are remote from the levers, can have pivot holes which extend transversely to the direction of movement and into which there extend journals of the touch pad or of the touch pad support which extend transversely to the direction of movement.

However, it is also possible for those ends of the third elastic connecting webs, which are remote from the levers, to be connected to one another by a connecting arm which can be arranged on the touch pad or on the touch pad support.

Another possibility for acting upon the mutually remote ends of the levers by means of the touch pad consists in the touch pad or the touch pad support bearing on the mutually remote ends of the levers.

A design of the lever mechanism which is particularly economical in terms of components consists in the two levers which are connected to one another at their mutually adjacent ends by the second elastic connecting web, and/or the fixed joint designed as an elastic connecting web and/or the base element and/or the third elastic connecting webs at the mutually remote ends of the levers and/or the connecting arm being designed as a one-piece component made from a material of spring elasticity.

The one-piece component is preferably produced in a simple manner such as a stamping of a metallic material.

However, it is also possible for the one-piece component to be plastic and, in particular, to be a plastic injection molding.

The touch pad preferably has a rectangular peripheral contour.

The lever mechanisms is preferably arranged on two mutually opposite edges of the touch pad or additionally also on a third edge of the touch pad.

Particularly good guidance is achieved if a lever mechanism is arranged on each edge of the touch pad.

A particularly small overall height of the touch pad arrangement is achieved if the levers are hinged on the peripheral lateral edge of the touch pad support by their mutually remote ends.

The touch pad can be designed to allow light to be shone through by one or more light sources, it being possible for the light sources to be arranged on the side of the touch pad facing away from the sensitive operating surface.

A circuit board carrying the light sources is preferably arranged on the side facing away from the sensitive operating surface of the touch pad or of the touch pad support.

If the touch pad or the touch pad support can be driven in such a way that it can be moved between the rest position and the lowered position by a drive, especially an electric-motor drive, then the touch pad is moved into its lowered position when the operating surface is touched. After the touch pad has been actuated, it travels back to its rest position.

In a simple design, the drive can be a spindle drive, the drive spindle of which, which is provided with a thread, extends in the direction of movement and engages in a spindle nut firmly connected to the touch pad or to the touch pad support, it being possible for the spindle nut to be formed in a support element connected to the touch pad or to the touch pad support.

It is self evident that any other suitable design of the drive is possible.

BRIEF DESCRIPTION OF THE DRAWINGS

Exemplary embodiments of the invention are illustrated in the drawing and are described in greater detail below. In the drawings:

FIG. 3 is a perspective exploded view of the touch pad arrangement shown in FIG. 1 with a touch pad housing;

FIG. 4 is a perspective view of the touch pad arrangement installed in the touch pad housing;

FIG. 5 is a second embodiment of the levers of a lever mechanism;

FIG. 6 is a third embodiment of the levers of a lever mechanism; and

FIG. 7 is a fourth embodiment of the levers of a lever mechanism.

DETAILED DESCRIPTION OF THE DRAWINGS

Figure 2:
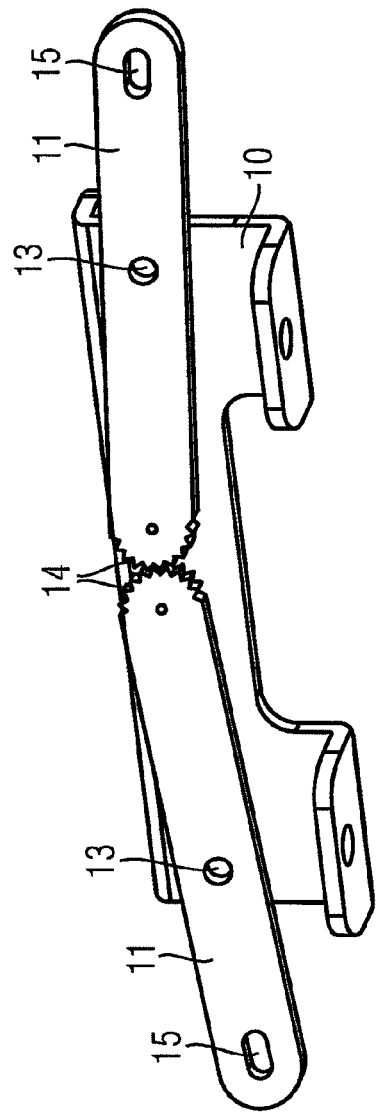
FIG. 2 is a perspective view of a lever mechanism of the touch pad arrangement shown in FIG. 1.
Figure 1:
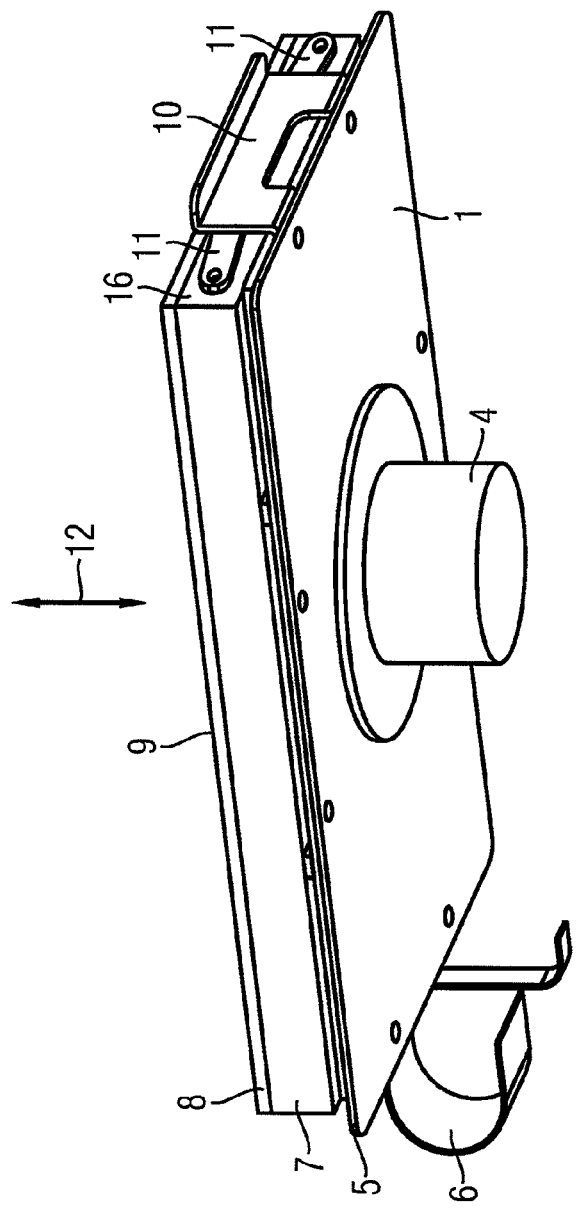
FIG. 1 is a perspective view of a touch pad arrangement.

The touch pad arrangement illustrated in FIGS. 1 to 4 has a support 1 in the form of a plate with a central hole 2, through which there projects a threaded drive spindle 3 of an electric-motor spindle drive 4 that can be driven reversibly. The spindle drive 4 is arranged in a fixed manner on the underside of the support 1, thus allowing the component assembly arranged above the support 1 to be raised or lowered by turning the drive spindle 3.

Arranged on the upper side of the support element 1 is a circuit board 5 which bears a number of light sources 50 and from which there starts a flexible conductor 6. Arranged on the circuit board 5 there is a touch pad support 7 in the form of a plate, on which a touch pad 8 with a sensitive operating surface 9 is arranged. A second flexible conductor 17 starts from the touch pad 8.

The touch pad 8, the touch pad support 7 and the circuit board 5 preferably have a same rectangular peripheral contour, while the rectangular support 1 preferably projects beyond this contour on all sides.

Arranged in each of three edge regions of the support 1 is a lever mechanism shown in FIG. 2, which comprises a holder 10 attached to the support 1 and a pair of levers 11 of equal length.

The two levers 11 extend approximately longitudinally relative to one another and, in the center of their length, are each mounted on the holder 10 in such a way that they can pivot about a pivot 13 that extends transversely to the direction of movement 12 of the touch pad 8.

In one embodiment on the end faces of the mutually adjacent ends, the levers 11 have gear segments 14, the teeth of which engage in one another, with the result that a pivoting motion of one lever 11 is transmitted to the other lever.

Elongated holes 15 extending in the direction of longitudinal extension of the levers 11 are formed in the end regions of the mutually remote ends of the levers 11 and, projecting into these holes are pivot pins 16', which are arranged on the side faces 16 of the touch pad support 7.

The entire touch pad arrangement is arranged in a touch pad housing 18, which has a window 19 that leaves the operating surface 9 free.

When touching and actuation of the operating surface 9 by an operator is detected, a control signal for the spindle drive 4 is triggered, which drives the assembly comprising the circuit board 5, the touch pad support 7 and the touch pad 8 downward by about 0.5 mm out of its raised rest position into the lowered position along direction of number 12. Once this actuation is ended, the drive spindle 4 drives the assembly back into its rest position.

Irrespective of whether the touch pad 9 is acted upon centrally or away from the center, the lever mechanisms 11 ensure that movement occurs in the direction of movement, without tilting.

In FIG. 5, levers 11' are connected by elastic connecting webs 20 to a common base element 21 that can be arranged firmly on the support 1.

The mutually adjacent ends of the levers 11' are furthermore connected to one another by a second elastic connecting web 22, the mutually adjacent ends of the levers 11' being arranged offset relative to one another in the direction of movement 12, and the second connecting web 22 extending approximately in the direction of movement 12.

The mutually remote ends of the levers 11' are connected by means of third elastic connecting webs 23 extending approximately in the direction of movement 12 to a common connecting arm 24, which extends approximately parallel to the levers 11' and can be fastened to the touch pad support 7.

The exemplary embodiment in FIG. 6 corresponds to a large extent to the exemplary embodiment in FIG. 5.

By contrast, however, there is no common base element 21 but instead each lever 11" is assigned its own base element 21'.

Moreover, the third connecting webs 23 are not connected to one another by a common connecting arm 24 but have pivot holes 25 into which spindles 16' on the touch pad support 7 project, said spindles 16' extending transversely to the direction of movement 12.

In the exemplary embodiment in FIG. 7, the levers 11' are connected to one another by a connecting web 22.

However, they can be mounted on the holders 10 in such a way that they can be pivoted about pivots 13.

Formed on their mutually remote ends are bearing stubs 26, which point towards the touch pad 8 and on which the assembly comprising the circuit board 5, the touch pad support 7 and the touch pad 8 can be placed while remaining free.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A touch pad arrangement comprising:
a touch pad having a touch sensitive operating surface, the touch pad configured for movement without tipping in a direction of movement between a raised rest position and a lowered position;
a touch pad support configured to support the touch pad; and a guide mechanism configured to guide the touch pad between the raised rest position and the lowered position, the guide mechanism comprising:
a lever mechanism arranged on at least two mutually opposite side areas of one of the touch pad and the touch pad support, the lever mechanism comprising:
a flexible connection; and
two levers which extend approximately longitudinally relative to one another, each of the two levers being pivotably mounted such that the two levers can pivot about respective fixed joints with pivot axes that extend transversely to the direction of movement of the touch pad, the two levers configured to be acted upon in the direction of movement of the touch pad at mutually remote lever ends by the one of the touch pad and the touch pad support, the two levers being connected to each other at their mutually adjacent ends by the flexible connection,
wherein each of the respective fixed joints comprise a pivot pin arranged at a fixed location on which the respective lever is pivotably mounted.

2. The touch pad arrangement as claimed in claim 1, wherein each lever has a pivot hole configured to mount the lever pivotably on its respective pivot pin.

3. A touch pad arrangement comprising:
a touch pad having a touch sensitive operating surface, the touch pad configured for movement without tipping in a direction of movement between a raised rest position and a lowered position;
a touch pad support configured to support the touch pad; and a guide mechanism configured to guide the touch pad between the raised rest position and the lowered position, the guide mechanism comprising:
a lever mechanism arranged on at least two mutually opposite side areas of one of the touch pad and the touch pad support, the lever mechanism comprising:
a flexible connection; and
two levers which extend approximately longitudinally relative to one another, each of the two levers being pivotably mounted such that the two levers can pivot about respective fixed joints with pivot axes that extend transversely to the direction of movement of the touch pad, the two levers configured to be acted upon in the direction of movement of the touch pad at mutually remote lever ends by the one of the touch pad and the touch pad support, the two levers being connected to each other at their mutually adjacent ends by the flexible connection,
wherein each of the fixed joints comprises a first elastic connecting web, a first end of the first elastic connecting web is arranged at a fixed location and a second end of the first elastic connecting web opposite the first end is connected to the lever.

4. The touch pad arrangement as claimed in claim 3, wherein respective first ends of the first elastic connecting webs are connected to a common base element in a fixed manner.

5. The touch pad arrangement as claimed in claim 1, wherein the flexible connection at the mutually adjacent ends of the two levers is a second elastic connecting web.

6. The touch pad arrangement as claimed in claim 5, wherein the mutually adjacent ends of the two levers are arranged offset relative to one another in the direction of movement, and the second elastic connecting web is configured to extend approximately in the direction of movement.

7. The touch pad arrangement as claimed in claim 1, wherein the flexible connection between the mutually adjacent ends of the two levers is formed by respective gear segments which extend from the adjacent ends of the two levers in a plane corresponding to the direction of movement, the teeth of the respective gears configured to engage in one another.

8. The touch pad arrangement as claimed in claim 1, wherein the two levers are hinged to one of the touch pad and the touch pad support at their mutually remote ends such that the two levers can be pivoted about pivot axes extending transversely to the direction of movement of the touch pad.

9. The touch pad arrangement as claimed in claim 8, wherein the mutually remote ends of the two levers have elongate holes which extend in a direction of longitudinal extension and into which pivot pins of one of the touch pad and the touch pad support that extend transversely to the direction of movement project.

10. The touch pad arrangement as claimed in claim 4, wherein the mutually remote ends of the two levers are connected to one of the touch pad and the touch pad support by a third elastic connecting web.

11. The touch pad arrangement as claimed in claim 10, wherein a respective end of each of the third elastic connecting webs that is remote from the two levers has a pivot hole which extends transversely to the direction of movement and into which a journal of one of the touch pad and the touch pad support extends.

12. The touch pad arrangement as claimed in claim 10, wherein the respective ends of each of the third elastic connecting webs that are remote from the two levers are connected to one another by a connecting arm arranged on one of the touch pad and the touch pad support.

13. The touch pad arrangement as claimed in claim 1, wherein one of the touch pad and the touch pad support bear on the mutually remote ends of the two levers.

14. The touch pad arrangement as claimed in claim 12, wherein at least one of the two levers, which are connected to one another at their mutually adjacent ends by a second elastic connecting web, the fixed joint designed as an elastic connecting web, the base element, the third elastic connecting webs at the mutually remote ends of the, and the connecting arm are designed as a one-piece component made from a material of spring elasticity.

15. The touch pad arrangement as claimed in claim 14, wherein the one-piece component is a stamping of a metallic material.

16. The touch pad arrangement as claimed in claim 1, wherein the touch pad has a rectangular peripheral contour.

17. The touch pad arrangement as claimed in claim 1, wherein the two levers are hinged on a peripheral lateral edge of the touch pad support by their mutually remote ends.

18. The touch pad arrangement as claimed in claim 1, wherein the touch pad is configured to allow light to shine through, the light generated by one or more light sources.

19. The touch pad arrangement as claimed in claim 18, wherein the light sources are arranged on the side of the touch pad facing away from the sensitive operating surface.

20. The touch pad arrangement as claimed in claim 19 wherein a circuit board carrying the light sources is arranged on one of a sensitive operating surface of the touch pad and the touch pad support.

21. A touch pad arrangement comprising:
a touch pad having a touch sensitive operating surface, the touch pad configured for movement without tipping in a direction of movement between a raised rest position and a lowered position;
a touch pad support configured to support the touch pad; and a guide mechanism configured to guide the touch pad between the raised rest position and the lowered position, the guide mechanism comprising:
a lever mechanism arranged on at least two mutually opposite side areas of one of the touch pad and the touch pad support, the lever mechanism comprising:
a flexible connection; and
two levers which extend approximately longitudinally relative to one another, each of the two levers being pivotably mounted such that the two levers can pivot about respective fixed joints with pivot axes that extend transversely to the direction of movement of the touch pad, the two levers configured to be acted upon in the direction of movement of the touch pad at mutually remote lever ends by the one of the touch pad and the touch pad support, the two levers being connected to each other at their mutually adjacent ends by the flexible connection,
wherein one of the touch pad and the touch pad support is driven such that it can be moved between the rest position and the lowered position by an electric-motor drive.

22. The touch pad arrangement as claimed in claim 21, wherein the drive is a spindle drive, a drive spindle is provided with a thread extending in the direction of movement and which engages in a spindle nut connected to one of the touch pad and the touch pad support.

23. The touch pad arrangement as claimed in claim 22, wherein the spindle nut is formed in a support connected to one of the touch pad or to the touch pad support.

\* \* \* \* \*